UNITED STATES PATENT OFFICE.

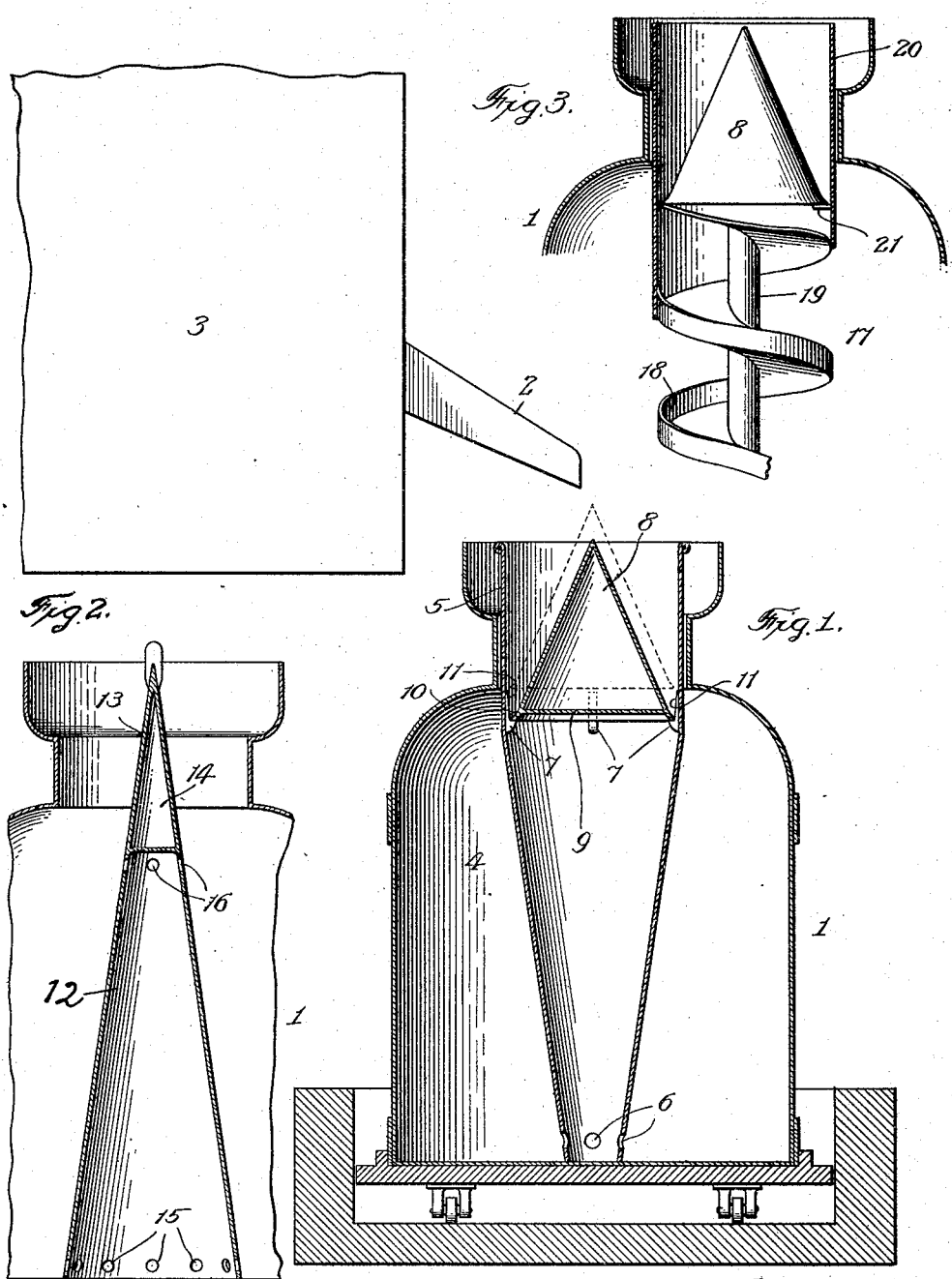

GORDON VALENTINE, OF CHICAGO, ILLINOIS.

DEVICE FOR FILLING MILK-CANS.

1,183,915.  Specification of Letters Patent.  Patented May 23, 1916.

Application filed January 15, 1914. Serial No. 812,274.

*To all whom it may concern:*

Be it known that I, GORDON VALENTINE, a citizen of the United States, residing at Chicago, in the county of Cook and State of Illinois, have invented certain new and useful Improvements in Devices for Filling Milk-Cans, of which the following is a description, reference being had to the accompanying drawings, forming a part of this specification, in which corresponding letters of reference in the different figures indicate like parts.

One of the imperative requirements incident to the successful and sanitary handling of milk in cans, is that they shall be properly filled. Carelessness in this respect is certain to lead to unsanitary results as well as to financial loss. Should a can be too full, the adjustment of the cover will cause a thin film of milk to rise between the can neck and the cover or closure, which in a short time will become sour and rancid and when the cover is removed it will drop back into the can to contaminate the contents and induce bacterial growth. On the other hand, if the can is not entirely full, the milk will "churn" during transportation and become unsalable.

The one cause which, more than any other, interferes with the proper filling of milk-cans, lies in the viscous character of the liquid and its consequent tendency to froth when agitated. Under ordinary methods, the foam invariably accumulates to such an extent as to prevent the attendant from seeing when the cans are full. As a result, it is necessary to allow them, when nearly full, to stand for an indefinite time so as to "froth off", in order that additions may be made to raise the milk to the proper level, thereby subjecting it to contamination in the open vessels in which dust is free to fall. Moreover, the animal gases from the fresh milk, instead of escaping, are liable to become imprisoned in the foam globules, if the froth is not entirely dissipated, and retained in the can to the detriment of the milk.

The object of my invention is to overcome this difficulty by providing simple and effective means for preventing the milk from foaming while being poured into the can, as well as to indicate to the attendant when the can is filled to the proper level:—all of which is hereinafter more particularly described and definitely pointed out in the claims.

In the drawings, Figure 1, represents a side elevation of a reservoir or milk separator, together with a central vertical sectional view of a milk can showing my improvement in its preferred form applied thereto, Fig. 2, is a like view of a modified construction, and Fig. 3, represents a vertical section of a part of a can and a portion, partly in section, of a further modified form of conduit.

Referring to the drawings, 1, represents a milk can of the usual construction located beneath the spout 2, of a separator or reservoir 3, to enable the milk to flow into the can. Placed vertically within the can is a removable conduit or conveyer, generally designated by 4, the length of which should correspond substantially to the height of the can. The upper portion 5, of said conveyer is cylindrical in form and somewhat longer than the can neck, while the lower portion is preferably tapered downwardly as shown, the lower end being intended to rest upon the bottom of the can. Openings 6, are formed at or near the lower extremity of the conveyer to enable the milk to be discharged into the can. The diameter of the part 5, is somewhat less than that of the can neck, so as to enable it to be readily inserted within the latter, and there is provided upon the inner face of the same at a level slightly below the lower portion of the can neck, a plurality of shoulders or lugs 7, which are located at a common level. A hollow sheet-metal spreading member 8, preferably conical or conoidal in form, so as to be gradually widened from its apex to its base, is loosely supported upon the lugs 7, the diameter of said spreading member at its base being somewhat less than that of the cylindrical portion 5. The bottom 9, of said spreading member is preferably above the level of the rim 10, which latter is curved or flared outwardly as shown, in order, with greater certainty, to direct the film of milk in an annular stream against the walls of the conduit 4. For the purpose of centering the spreader 8, so that all parts of its rim may be equi-distant from the wall of the conduit, I prefer to form wedge-shaped portions 11, upon the lugs 7, to engage and adjust the periphery of the rim 10, when the spreader is placed in the conduit.

The operation is as follows: The conduit having been placed in the can as shown, with the spreader 8, resting upon the supports 7, a stream of milk is permitted to flow upon the apex of the conical spreader, which causes it to expand over the widening surface in a thin film and to be delivered in an annular sheet against the inner wall of the conduit 4, from whence it is passed downwardly in a like film until it is discharged through the openings 6, into the can. When the body of the milk rises into contact with the base of the spreading float, the latter is lifted; thereby indicating to the attendant that the can is full. The normal level or resting place of the float should be so adjusted with reference to the base of the can neck, that when the float begins to move, the level of the milk will be such as to permit the closure to enter the neck of the can without leaving a vacant space beneath and without forcing any of the liquid upwardly around the closure. As a result of the construction described, the entire flow of the milk from top to bottom of the can, will be gentle and in a thin layer against the wall of the conduit, thereby preventing air from becoming entrapped to mingle with the viscid liquid and form bubbles and globules to accumulate in a mass of foam. As an incident, it is obvious that such animal gases as would thus be entrapped, will likewise be permitted to escape.

It is obvious that the spreading float need not be separable from the conduit nor need it be inclosed therein. In Fig. 2, I have shown a combined float and conduit which consists of a hollow conical structure, generally designated by 12, the upper portion 13, of which is provided with a hollow airtight chamber 14, to render it buoyant and form a float to be actuated when the milk rises to the proper level. Openings 15, at the bottom, serve as milk passages, while like openings 16, enable the air to escape from the interior. While in this instance, the milk is caused to flow upon the outside of the conduit, the flow is the same in character and serves to obviate foaming.

While I regard a cone as the best form of spreading device, I do not wish to be limited thereto, inasmuch as the form may be varied while the principle is maintained; nor do I wish to be limited to a specific form of conduit, provided it be such as will tend to impede the flow of the milk and cause it to descend gently in a thin film without forming bubbles. Such a construction is shown in Fig. 3, in which a spiral conveyer 17, having an outer vertical flange 18, is formed around a central supporting tube 19, which is intended to extend from a level slightly below that of the neck of the can to the can bottom. Surrounding a portion of the upper end of the spiral and extending upwardly therefrom, is a cylindrical casing 20, of smaller diameter than that of the can neck and which is adapted to extend upwardly through the latter as shown, with a space between for the escape of air. A spreading float 8, corresponding to that shown in Fig. 1, is adapted to rest loosely therein upon suitable supports, one of which is shown at 21.

It is obvious that the action of the spreader would be the same whether separable from or rigidly attached to the conduit; but I prefer to utilize it as a float for the purpose specified.

Having thus described my invention, I claim:

1. A foam preventing device for filling vessels with fluids, comprising, in combination, a removable conductor for insertion within the vessel to be filled, said conductor being formed to extend from the top to the bottom of said vessel and provided with a conducting surface adapted to receive the liquid at the top and conduct it in a thin film upon a continuous downward incline, said conductor being formed to permit the liquid to escape into the vessel without any direct fall and means for delivering said liquid in a thin film against the upper portion of said conducting surface.

2. A foam preventing device for filling vessels with fluids, comprising, in combination, a removable conductor for insertion within the vessel to be filled, said conductor being formed to extend from the top to the bottom of said vessel and provided with a conducting surface adapted to receive the liquid at the top and conduct it in a thin film upon a continuous downward incline, to permit the liquid to unite with that in the vessel without any direct fall, the outer diameter of said conductor being less than that of the mouth of the receptacle in which it is placed to provide for the free escape of air from the body of said receptacle and means for delivering said liquid in a thin film against the upper portion of said conducting surface.

3. A foam preventing device for filling vessels with liquid, comprising, in combination, a removable conductor for insertion within the vessel to be filled, said conductor being formed to extend from the top to the bottom of said vessel, the same having an inclined surface for conducting the liquid downwardly thereupon in a thin film, said conductor being adapted to permit the liquid to mingle with that in the vessel without disturbance, and means for delivering said liquid in a thin film against the upper portion of said conducting surface and for indicating the rise of the liquid within the vessel to a predetermined level.

4. A foam preventing device for filling vessels with fluids, comprising, in combination, a conductor adapted to extend downwardly from the top to the bottom of a liquid receiver, said conductor having an inclined wall for causing the liquid to flow in a thin film upon its surface and buoyant means at the upper part of said conductor for simultaneously spreading the liquid in a thin film against the wall of said conductor and indicating the rise of liquid to a predetermined level within the receiver.

5. In a device of the class described, the combination with a downwardly tapered tube arranged to extend from the inlet opening to the bottom of a liquid-holding receptacle, said tube being formed to permit an outflow at the lower end, of a conoidal shaped float loosely supported within and near the upper end of said tube, the base of said float being smaller than the diameter of said tube at its point of support, to act as a spreader to spread the liquid against the walls of the tube and to indicate by its movement when the liquid shall have attained a predetermined level.

6. A device of the class described, in which is combined a conduit for insertion within a liquid-holding receptacle, said conduit being constructed to cause the liquid to flow in a thin film upon its surface and a liquid-spreading float loosely supported near the upper end of said conduit to spread the liquid upon the surface of the conduit and to indicate when the liquid shall have reached a given level.

In testimony whereof, I have signed this specification in the presence of two subscribing witnesses, this 12th day of January, 1914.

GORDON VALENTINE.

Witnesses:
DAVID H. FLETCHER,
JENNIE L. FISKE.

Copies of this patent may be obtained for five cents each, by addressing the "Commissioner of Patents, Washington, D. C."